W. H. ALLEN.

Assignor to S. M. BIXBY.

MANUFACTURE OF BOXES.

No. 9,815. Reissued July 19, 1881.

Witnesses:
Thos. W. Rich
R. C. Schaider

Inventor:
William H. Allen

UNITED STATES PATENT OFFICE.

WILLIAM H. ALLEN, OF BROOKLYN, NEW YORK, ASSIGNOR TO SAMUEL M. BIXBY, OF NEW YORK, N. Y.

MANUFACTURE OF BOXES.

SPECIFICATION forming part of Reissued Letters Patent No. 9,815, dated July 19, 1881.

Original No. 182,543, dated September 26, 1876. Application for reissue filed March 22, 1881.

*To all whom it may concern:*

Be it known that I, WILLIAM H. ALLEN, of the city of Brooklyn, King's county, State of New York, have invented a new and useful Improvement in the Manufacture of Boxes, constituting a new and improved box for packing or holding articles, which improvements are fully set forth in the following specification and accompanying drawings.

The object of my invention is to produce a box from a cheap material, and one which will be oil and water proof; and it consists in a novel method of making a box from leather board or leather paper, which material has a sufficient amount of elasticity, ductility, and compressibility to permit its being struck up to the desirable shape by means of (a punch and die) pressure. It will also permit of embossing or printing, and the material may be colored various shades. It is then coated with thin shellac, which renders it oil and water proof and hard.

My invention further consists in the product obtained by and through the aforesaid process—to wit: a box (either top or bottom) composed of one piece or sheet of leather board or paper formed by being forced or struck up into the desired shape by (punch and die) pressure, rendered oil and water proof and hard, as herein stated.

Figure 1:
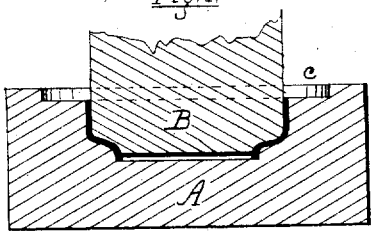
Figure 2:
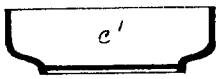
Figure 3:
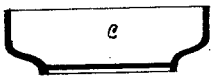

In the accompanying drawings, Figure 1 shows cross-section of the punch and die, illustrating the method of forming and shaping the sheet of leather board or paper under pressure. Fig. 2 is cross-section of leather board or paper after removal from the die-press. Fig. 3 is a similar view, and Fig. 4 is a cross-section of a box complete.

In the manufacture I take a sheet of leather board or leather paper of desired quality and thickness. This I cut into shape and moisten slightly. It is then placed in the proper die and pressure applied until formed, struck up, and compressed into shape, as shown in Figs. 2 or 3, when it will retain the shape thus given. The leather board or paper box thus formed is then treated or covered with a thin coating of oil, colored as desired, and then coated with shellac, which, when dry, gives it a nice bright finish, hardens it, and makes it oil and water proof. If desired, it may then be printed on.

Figure 4:
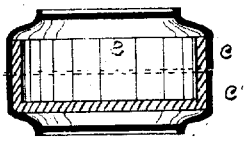

Fig. 4 represents a box made of three pieces of leather board or paper which has been struck up or formed in dies; *c'*, bottom; *e*, inner piece or lining, and *c* upper piece or cover.

If desired, the inner piece or lining, *e*, may be cemented to the bottom *c'* by shellac or glue.

If desired, the board, formed as shown in Figs. 2 and 3, may be used for various purposes, such as forming the bottom or covers to paper boxes or covers to jars for fruit, &c.

What I claim as new, and desire to secure by Letters Patent, is—

1. An improved process of manufacturing boxes from leather board or paper, consisting in moistening the stock and shaping it in a suitable die by compression, then applying a coating of oil, and lastly treating it with shellac, substantially as set forth.

2. A box or cover composed of one piece or sheet of leather board or paper formed or molded into completed shape by compression, and rendered oil and water proof by two coatings, the first of oil and the second of shellac, substantially as described and set forth.

3. In combination with the box *c*, composed and struck up and treated, as described, of and from a piece or sheet of leather board or paper, the inner lining, *e*, substantially as and for the purpose set forth.

4. An oil and water proof packing-box, consisting of cover *c*, bottom *c'*, and lining *e*, composed of leather board or paper, substantially as shown and described.

WILLIAM H. ALLEN.

In presence of—

THEO. W. RICH,

R. C. SCHAIDER.